United States Patent
Meisenberg et al.

(10) Patent No.: US 12,098,934 B2
(45) Date of Patent: Sep. 24, 2024

(54) INDUCTIVE ANGLE SENSOR

(71) Applicant: TE Connectivity Sensors Germany GmbH, Dortmund (DE)

(72) Inventors: Armin Meisenberg, Dortmund (DE); Reinhold Pieper, Dortmund (DE); Axel Bartos, Dortmund (DE)

(73) Assignee: TE Connectivity Sensors Germany GmbH, Dortmund (DE)

( * ) Notice: Subject to any disclaimer, the term of this patent is extended or adjusted under 35 U.S.C. 154(b) by 0 days.

(21) Appl. No.: 17/684,870

(22) Filed: Mar. 2, 2022

(65) Prior Publication Data

US 2022/0282997 A1 Sep. 8, 2022

(30) Foreign Application Priority Data

Mar. 2, 2021 (EP) .................................. 21160154

(51) Int. Cl.
*G01D 5/20* (2006.01)
*G01B 7/30* (2006.01)
*G01D 5/245* (2006.01)

(52) U.S. Cl.
CPC ............. *G01D 5/2046* (2013.01); *G01B 7/30* (2013.01); *G01D 5/2452* (2013.01); *G01D 5/2455* (2013.01)

(58) Field of Classification Search
CPC ...... G01B 7/30; G01D 5/2046; G01D 5/2452; G01D 5/2455
See application file for complete search history.

(56) References Cited

U.S. PATENT DOCUMENTS

| | | | | |
|---|---|---|---|---|
| 4,810,967 A | * | 3/1989 | Yokoyama | H03M 1/245 324/207.2 |
| 6,384,598 B1 | | 5/2002 | Hobein et al. | |
| 6,522,128 B1 | * | 2/2003 | Ely | G01D 5/204 324/207.17 |
| 7,208,944 B2 | * | 4/2007 | Tatschl | G01D 5/2492 324/207.2 |
| 2002/0175673 A1 | * | 11/2002 | Butzmann | G01D 5/2452 324/207.2 |
| 2005/0139017 A1 | * | 6/2005 | Tokumoto | G01L 3/109 73/862.328 |
| 2011/0115481 A1 | * | 5/2011 | Katou | G01D 5/04 324/207.25 |

(Continued)

OTHER PUBLICATIONS

European Patent Office, Application No. 21160154.7-1010, dated Aug. 31, 2021, 9 pages.

*Primary Examiner* — Steven L Yeninas
(74) *Attorney, Agent, or Firm* — Barley Snyder

(57) ABSTRACT

An inductive angle sensor includes an exciter coil, an oscillator circuit, a plurality of receiver coils, an evaluation circuit evaluating a plurality of signals induced in the receiver coils, and a coupling element that is movable and influences a strength of an inductive coupling between the exciter coil and the receiver coils. The coupling element has a first encoder element and a second encoder element. The coupling element has a third encoder element formed as a conducting extension with an asymmetric geometry. The asymmetric geometry influences the strength of the inductive coupling between the exciter coil and the receiver coils only in a part of a plurality of periodically repeating loop structures of the receiver coils.

19 Claims, 8 Drawing Sheets

(56) References Cited

U.S. PATENT DOCUMENTS

| | | | |
|---|---|---|---|
| 2015/0253153 A1* | 9/2015 | Smithanik | G01D 5/2013 |
| | | | 324/207.25 |
| 2017/0227379 A1 | 8/2017 | Oshinubi et al. | |
| 2018/0274948 A1 | 9/2018 | Maniouloux et al. | |
| 2019/0170494 A1 | 6/2019 | Tiemann et al. | |
| 2020/0173813 A1* | 6/2020 | Cai | G01D 5/2452 |

* cited by examiner

INDUCTIVE ANGLE SENSOR

CROSS-REFERENCE TO RELATED APPLICATIONS

This application claims the benefit of the filing date under 35 U.S.C. § 119(a)-(d) of European Patent Application No. 21160154.7, filed on Mar. 2, 2021.

FIELD OF THE INVENTION

The present invention relates to an angle sensor and, more particularly, to an inductive angle sensor.

BACKGROUND

An inductive sensor system comprises an exciter coil that couples an oscillating magnetic field in receiver coils. In more detail, as used herein, an inductive sensor, which is also referred to as an Eddy current sensor device, is a sensor that uses the principle of Eddy current formation to sense displacement. Eddy currents are formed when a moving or changing magnetic field intersects with a conductor or vice versa. In other words, a conductive encoder element influences a magnetic field in a sensing geometry. As used herein, a conductive element or tooth includes a ferromagnetic element, which will create comparable effects.

In more detail, the fast-changing magnetic field created by an AC-powered exciter coil causes voltages within at least one receiver coil. Further, when displacing a conductive element of an encoder, the factor of the conductive element covers the Eddy current sensors changes, and thereby the sensed value changes. Thus, a position, e.g. an angular position, can be determined.

The arrangement is very simple in design and inexpensive in production, and allows a highly accurate and reliable absolute angle determination.

Recently, there have been considerations about angle sensor technology in robot applications and its possible realization with magnetic encoders, e.g. sensors using anisotropic magnetoresistance (AMR). It has to be considered, however, that due to space restrictions, the scales can only have the shape of a narrow ring. Typically, the sensor has to fit within a narrow ring with a width of below 10 mm, or below 5 mm.

Further, a 360° absolute measurement without reference run is required. Further, the reproducibility must be very good, but the absolute measurement accuracy is less important. The reproducibility has to be below 0.1° while the absolute accuracy should be better than 1°.

In order to ensure 360° detection, only single-track coded scales can be considered when using sensors, such as an AMR sensor, since for space reasons two or even three parallel Vernier tracks cannot be accommodated on a narrow scale ring without strong signal crosstalk. However, the effort required to read an absolute, linear magnetic code including an exact interpolation is considerable, which has so far been an obstacle to the further pursuit of the AMR approach.

In the development of a robust inductive sensor, a Vernier-like version of an inductive sensor is known to be used, which includes two secondary coils with different numbers of periods, one above the other. Consequently, such an inductive sensor has two independent receiver geometries. Such an inductive sensor has the advantage over the AMR approach that the encoder neither needs small structures for the scale nor that the sensing elements generate crosstalk.

In more detail, in the case of two or three track Vernier scale of an AMR sensor array, there is always the problem of crosstalk between the individual scales. Solely, the associated scale determines the periodicity of the sensor signals, while the sensor can only passively measure the magnetic field presented. Thus, an AMR sensor always sees the scattered fields from the adjacent scales.

This is fundamentally different in a ring-shaped inductive sensor. Here, the signal period generated by the sensors is determined almost exclusively by the periodicity of the receiver coils. If it is ensured that the induced voltages are measured practically without current, the receiver coils do not perceive the existence of the other coil arrangement. Consequently, in general, no crosstalk occurs. Further, by calculating the phase difference of the two received signals of a plurality of sensor geometries, the angular position can be determined based on the principle of a Vernier scale. An inductive angle sensor having two secondary coils with different numbers of periods allows such a measurement principle.

SUMMARY

An inductive angle sensor includes an exciter coil, an oscillator circuit, a plurality of receiver coils, an evaluation circuit evaluating a plurality of signals induced in the receiver coils, and a coupling element that is movable and influences a strength of an inductive coupling between the exciter coil and the receiver coils. The coupling element has a first encoder element and a second encoder element. The coupling element has a third encoder element formed as a conducting extension with an asymmetric geometry. The asymmetric geometry influences the strength of the inductive coupling between the exciter coil and the receiver coils only in a part of a plurality of periodically repeating loop structures of the receiver coils.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
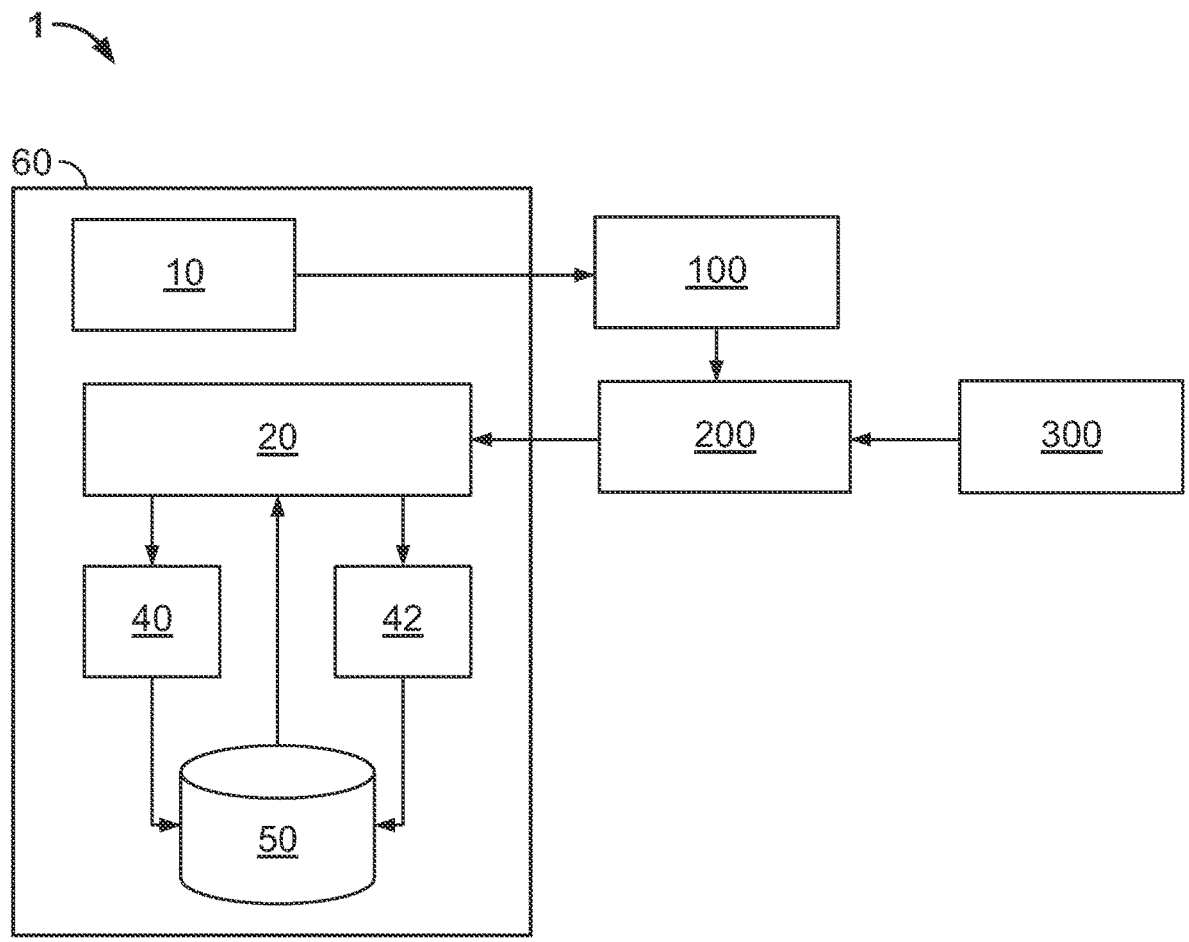
FIG. 1 is a block diagram of an inductive angle sensor according to an embodiment.

The inductive angle sensor will now be described in greater detail and in an exemplary manner using advantageous modifications and with reference to the drawings. The described modifications are only possible configurations in which, however, individual features can be provided independently of one another or can be omitted.

The accompanying drawings are incorporated into the specification and form a part of the specification to illustrate several embodiments of the present invention. These drawings, together with the description, explain the principles of the invention. The drawings are merely for the purpose of illustrating examples of how the invention can be made and used, and are not to be construed as limiting the invention to only the illustrated and described embodiments.

Furthermore, several aspects of the embodiments may form—individually or in different combinations—solutions according to the present invention. The following described embodiments thus can be considered either alone or in an arbitrary combination thereof. The described embodiments are merely possible configurations and it must be borne in mind that the individual features can be provided independently of one another or can be omitted altogether while implementing this invention. Further features and advantages will become apparent from the following, more particular description, of the various embodiments of the invention, as illustrated in the accompanying drawings in which like references refer to like elements.

The present invention will now be explained in more detail with reference to the Figures. Firstly, with reference to FIG. 1 the components of an inductive angle sensor 1 will be explained. The inductive angle sensor 1 comprises an oscillator circuit 10, an exciter coil 100, a receiver section 200, which comprises a plurality of receiver coils, an evaluation circuit 20, and a coupling element 300.

The inductive angle sensor 1 according to the embodiments described herein can be for arm angle determination in robots, but also in resolver applications for electric motors or generators. Angle sensors, in particular sensors covering a measurement range of 360°, require often that the shape is a narrow ring for mounting in through-shaft arrangements.

The oscillator circuit 10 generates a periodic AC signal. The oscillator circuit 10 couples into the exciter coil 100 and several receiver coils, each of which forms a periodically repeating loop structure, and the arrangement of which respectively forms a receiver geometry. The periodic AC signal is fed into the exciter coil 100. The receiver section 200 receives this time varying signal. The coupling element 300, which is also referred to as an encoder, manipulates the time varying filed, and thus, a position of the coupling element 300 can be determined.

As used herein, a receiver coil (which is also referred to as sense coil) is an electromagnetic coil, i.e. an electrical conductor such as a wire that is shaped. In other words, a receiver coil is a conductor with a plurality of loops. As used herein, a loop is a turn of the conductor or a winding of the receiver coil. Further, each receiver coil is formed by a plurality of loops, wherein the loops of each receiver coil can be arranged side by side in a sensing plane for covering a measurement range. Arranging turns side by side allows to easily form a planar coil. Further, the turns can be electrically connected. Such a configuration allows that each receiver coil need only two contacts.

In an embodiment, the receiver coils lie in a plane and are overlapping in one receiver section 200 or in a plurality of receiver sections 200. In other words, the receiver coils lie in a plane and are at least partly overlapping. For example, one receiver section 200 consists of the receiver coils that are overlapping. Alternatively, a plurality of receiver section 200 is provided, each comprising a part of the receiver coils that are overlapping. Such a configuration allows a particularly space saving arrangement.

In each turn of the receiver coils, a voltage is induced, namely in response to the periodic AC signal. In more detail, the sum of the voltages is the induced signal. Such a planar coil can be particularly easily fabricated, for example as a printed circuit board (PCB). Further, such a planar coil can be made of a flexible material, and thus, can be easily connected to a device, e.g. can be bended so as to follow a cylinder surface.

In case of a planar coil, at the crossing of the wires of two abutting turns, the conductor can be arranged on two levels. The levels can, for example, be separated by insulating layers, or the conductors can be arranged on a front and a backside of a PCB. Advantageously, abutting loops of a receiver coil are wound in opposite directions. Such a configuration enables that the net voltage of each receiver coils is zero. Consequently, the measuring range can be increased.

In an embodiment, the exciter coil 100 and/or at least one of the receiver coils lie in a plane, and/or the exciter coil 100 and at least one of the receiver coils comprises a conductive path on a printed circuit board (PCB). Such a configuration is easy-to-manufacture and to design the sensor compact. In an embodiment, the coils lie in the same plane. Such a plane has to be understood as a substantially flat object where one dimension is much smaller than the other two dimensions. Parts of the sensor can for example, be located on a front side of a PCB and other parts can be located on a backside of the PCB. This means that the sensor would still lie substantially in a plane, e.g. the sensing plane.

In an easy-to-manufacture embodiment, a first receiver coil is formed in a first layer, e.g. a first PCB, and the second receiver is coil are formed in a second layer, i.e a second PCB. Such a multilayer arrangement can be easily stacked. Additionally or alternatively, the exciter coil 100 surrounds at least one of the receiver coils.

In more detail, in the coupling element 300, Eddy currents are induced that cause a compensation of the external alternating field generated by the exciter coil 100. Further, the Eddy currents reduce the magnetic flux through parts of the receiver section 200. Ferromagnetic materials concentrate the field and have an inverse effect on the flux in the coil of the receiver. Therefore, both types of materials are detectable by inductive sensors.

The evaluation circuit 20 evaluates the signals induced in the receiver section 200, which influence the strength of an inductive coupling between the exciter coil 100 and the receiver coils. For example, the evaluation unit 20 measures the voltage induced in coils of the receiver. The fast changing magnetic field created by the AC-powered exciter coil 100 causes voltages within the receiver coils. Further, when moving the inductive coupling element 300, the factor of the inductive coupling element 300 that covers the receiver coils changes, thereby the sensed value changes. Based on the measured voltage value, a corresponding angular position of the encoder, the coupling element 300, can be determined.

Further, a controller 60 shown in FIG. 1 can be used for controlling the oscillator circuit 10 and the controller 60 can directly or indirectly receive the varying voltages induced in the receiver section 200. The measured values can then be processed directly in the evaluation circuit 20 of the controller 60. As used herein, a direct connection is a connection transmitting the output signal of the receiver coils without evaluating or manipulating the comprised information, i.e. the high frequency signal induced from the exciter 100 in the receiver coils. Such a configuration reduces the parts number, in particular an application-specific integrated circuit (ASIC) for generating one signal out of the pair of signals of a pair of sense coils of one of the receiver coils. In particular, recent developments in microcontroller technology enables detecting the MHz oscillating fields induced in the receiver coils and directly evaluate them without further using analog technology such as an ASIC to determine the angular position.

The controller 60 is arranged, for example, on a carrier with the exciter coil 100 and/or the receiver 200. Such a configuration allows to reduce the number of parts, e.g. using an additional ASIC. The controller 60 can have an output powering the exciter coil 100.

Figure 2:
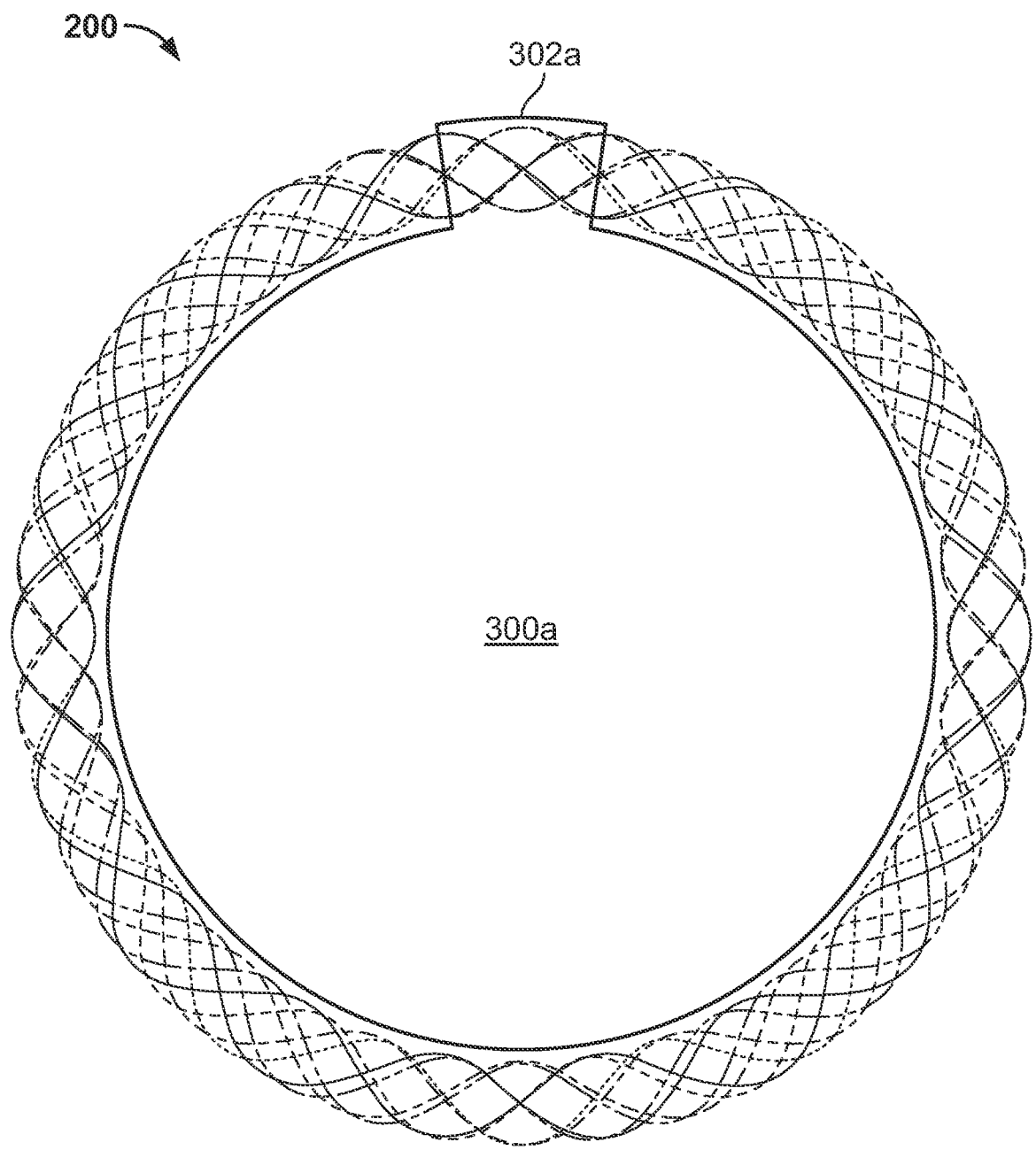
FIG. 2 is a schematic diagram of a receiver section of the inductive angle sensor.
Figure 3:
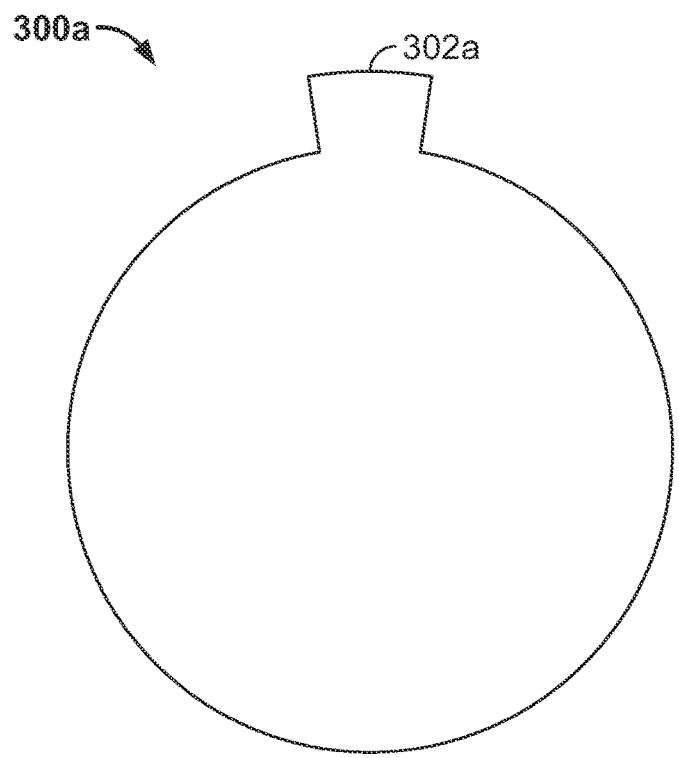
FIG. 3 is a schematic diagram of a coupling element of the inductive angle sensor.

FIG. 2 shows an example of a receiver section 200 and a coupling element 300a. The coupling element 300a is discussed with reference to FIG. 3. The coupling element 300a has only one tooth 302a in the shown embodiment. This tooth 302a makes the encoder operable as to determine an angular position.

In an embodiment, the coupling elements 300 and the receiver section 200 are arranged on planes extending perpendicular to the axis of rotation. Such a configuration allows a particular space saving arrangement. Alternatively, the coupling elements 300 rotate around an axis of rotation, wherein the coupling elements 300 and the receiver section 200 comprising the receiver coils are arranged on opposing lateral surfaces with respect to the axis of rotation. In other words, the coupling elements 300 and the receiver section 200 are planes laterally arranged to the axis of rotation. Such a configuration improves the connectivity of the sensor arrangement to an application, e.g. a robot arm.

As used herein, a tooth 302a or conducting tooth is an element extending from the coupling element 300. For example, assuming a polar or a cylindrical coordinate system and the origin being the axis of rotation, a tooth 302a extends in radial dimension and being delimited in azimuthal dimension. In more detail, assuming a flat coupling element 300, i.e. polar coordinates, the tooth or teeth may be formed by blades or wings. Alternatively, assuming a cylindrical element, i.e. cylindrical coordinates, the coupling element 300 with the teeth may be described, for example, by a gear.

Figure 4:
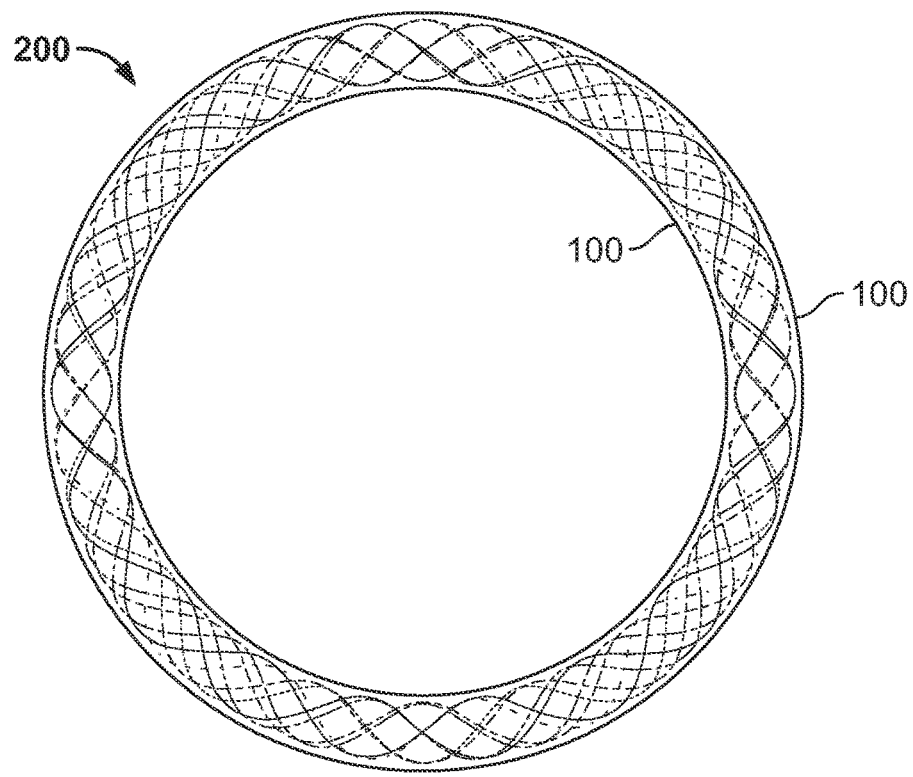
FIG. 4 is a schematic diagram of a receiver section according to another embodiment.

The receiver section 200 of FIG. 2 is also shown in FIG. 4. In addition, FIG. 4 shows an exciter coil 100. The receiver section 200 of FIG. 4 comprises a first receiver geometry 210, which is discussed with reference to FIG. 5, and a second receiver geometry 220, which is discussed with reference to FIG. 6. The exciter coil 100 is discussed with reference to FIG. 7.

Figure 5:
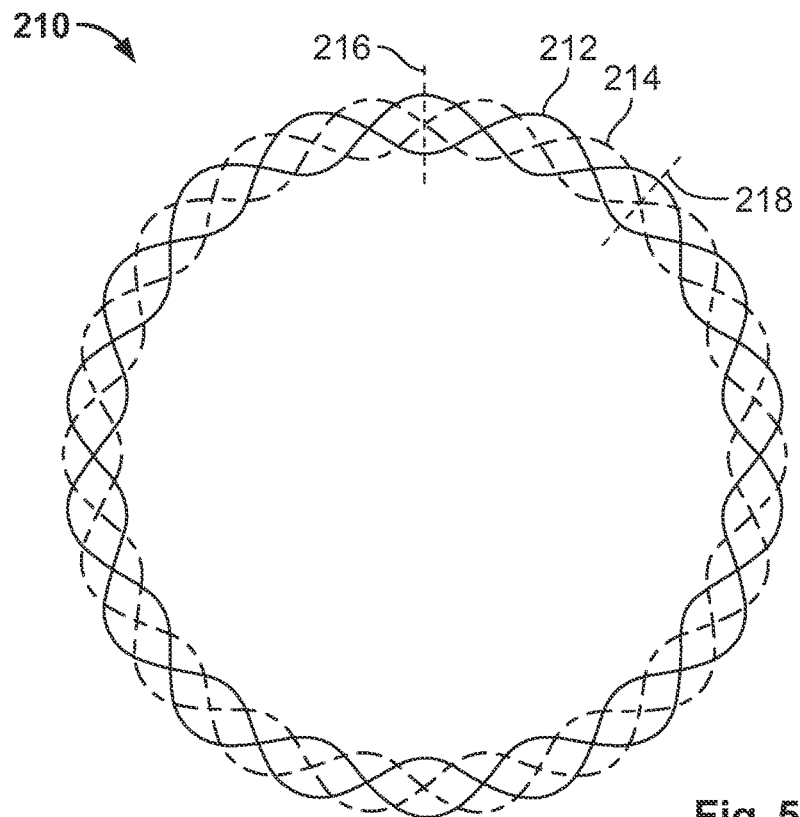
FIG. 5 is a schematic diagram of a first receiver coil of the receiver section of FIG. 4.
Figure 6:
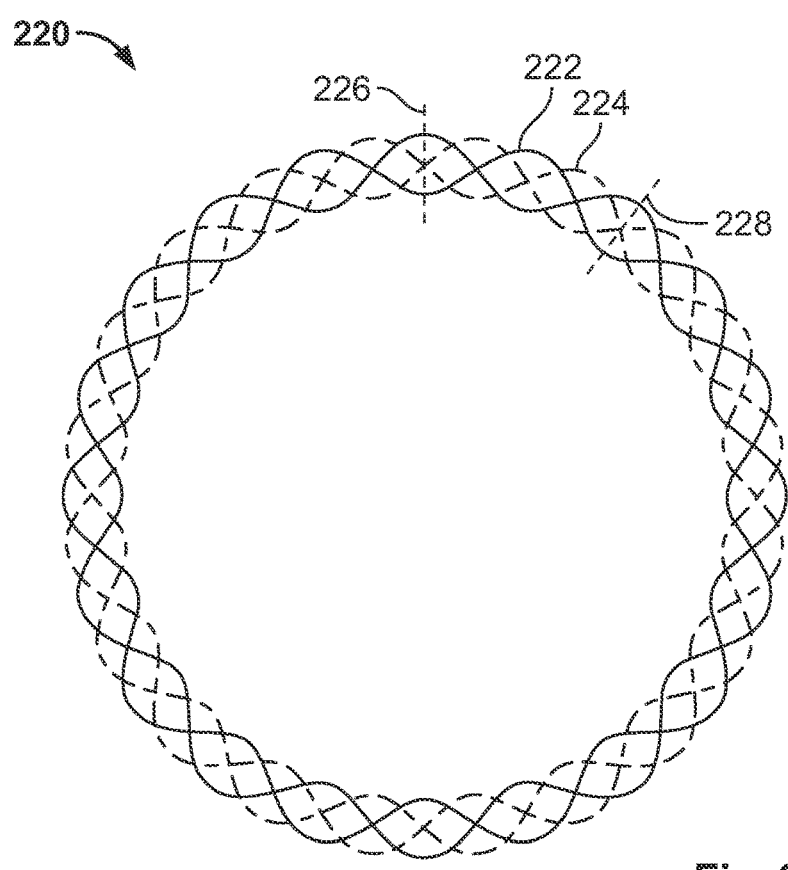
FIG. 6 is a schematic diagram of a second receiver coil of the receiver section of FIG. 4.

FIGS. 5 and 6 show each of the first receiver geometry 210 and second receiver geometry 220 as being formed by a periodically repeating loop structure. For example, as shown in FIGS. 5 and 6, each of the receiver geometries 210 and 220 is formed by a pair coils 212 and 214 or 222 and 224, respectively. Each pair of coils 212, 214 or 222, 224 has a loop structure, thereby forming a receiver geometry 210 or 220 with a certain period. The dotted auxiliary lines 216 and 218 delimit the fundamental period of receiver geometry 210. The dotted auxiliary lines 226 and 228 delimit the fundamental period of receiver geometry 220. In the present example, the first receiver geometry 210 is repeated m=9 times, and the second receiver geometry 220 is repeated n=10 in the measurement range of 2 pi.

In an embodiment, the different quantities of periodic repetitions are co-prime. Such a configuration allows using the principle of a Vernier scale. Such a configuration allows a particularly high precision. In other words, in the case of a measurement range of 360°, the quantities of periodic repetitions in the loop structures of the receiver coils of the two receiver geometries are co-prime.

Further, as shown in FIGS. 5 and 6, each receiver geometry 210, 220 can be formed by a pair of loop structures, also referred to as pair of coils 212 and 214 or 222 and 224. Each coil 212, 214, 222, and 224 delimits a plurality of areas. The areas of a pair of coils 212 and 214 or areas of a pair of coils 222 and 224 are congruent when shifted by a quarter of the respective period. Such a configuration allows to receive from each receiver geometry 210, 220 a pair of signals, e.g. one cosine like signal and one sinus like signal, because the areas delimited by the coils are congruent when shifted. Such a configuration allows to use an arc tan signal processing, and thus, increasing the resolution.

In another embodiment, each of the receiver coils may be formed by only one coil. Further, additional receiver coils may be provided.

Figure 7:
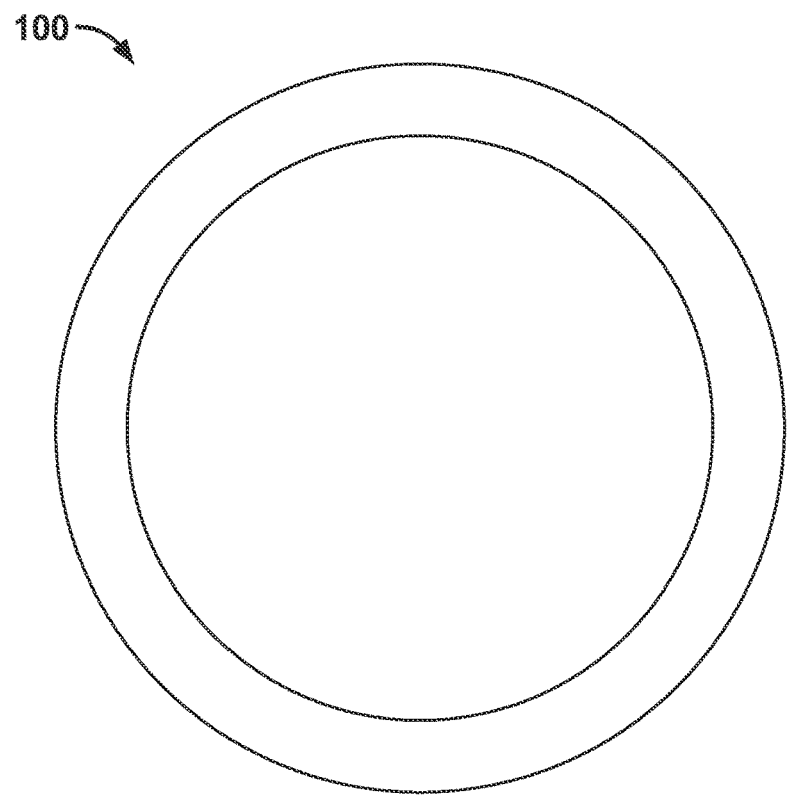
FIG. 7 is a schematic diagram of an exciter coil.

Further, as shown in FIG. 7, the exciter coil 100 can be formed by two concentric loops. As shown in FIG. 4, the encoder coil 100 can surround the first and second receiver coil 210 and 220. Such a configuration allows a compact sensor arrangement. However, other configurations of the encoder coil 100 are also possible.

Referring back to FIG. 2, the operation of the inductive sensor is described. In particular, the single tooth 302a, also referred to as blade, influences the coupling in one loop structure of the periodically repeating loop structure. A maximum signal amplitude is achieved with such a single tooth 302a at a tooth width of half a signal period, i.e. the width of one period. In the example of FIG. 2, this would be an 18° or 20° width for the secondary coils having quantities of periodic repetitions of 10 or 9, respectively. In order to get comparably good signals with both secondary receiver geometries 210 and 220, an averaged width of 19° is chosen in the example.

This solution, however, has two weak points. On the one hand, the tooth 302a always generates a maximum signal in only one single sub coil of each track, i.e. in one loop structure of the periodic structure. Thus, the attainable total signal amplitude is a small fraction of the theoretically possible amplitude. The second problem is the strong periodic measurement errors in an eccentric sensor arrangement. The reason for this is that only a single position on the encoder wheel of coupling element 300 contributes to the signal generation at all. With several teeth, distributed around the circumference, significantly reduced measurement errors due to eccentricities are achievable.

Figure 8:
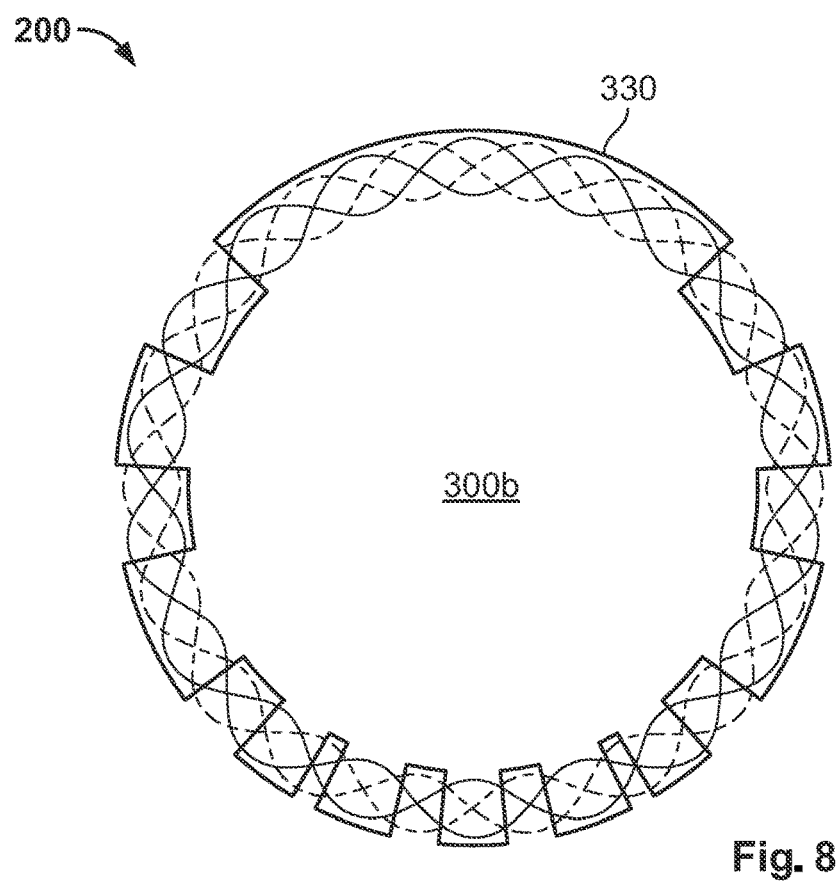
FIG. 8 is a schematic diagram of a receiver section and a coupling element according to another embodiment.

Such a configuration is shown in FIG. 8, which shows an example of a receiver section 200 and a coupling element 300b. The receiver section 200 is identical with the receiver discussed in FIGS. 2 and 4 to 6, and a description thereof is omitted. For a matter of presentation only, FIG. 8 does not show a second receiver geometry and an exciter coil. The description of the exciter coil is referred to the above description of FIGS. 4 and 7.

The coupling element 300b is discussed with reference to FIG. 9. The coupling element 300b has a plurality of teeth and thus can be used to determine an angular position. The coupling element of FIG. 9 comprises a first encoder element 310, which is discussed with reference to FIG. 10, a second encoder element 320, which is discussed with reference to FIG. 11, and a third encoder element 330. Providing a plurality of teeth reduces alignment errors. In particular, having teeth being azimuthal equally distributed, i.e. having the periodicity of the loop structure of the receiver, reduces errors such as an eccentric arrangement of the encoder 300 or the sensor relative to the axis of rotation.

Figure 10:
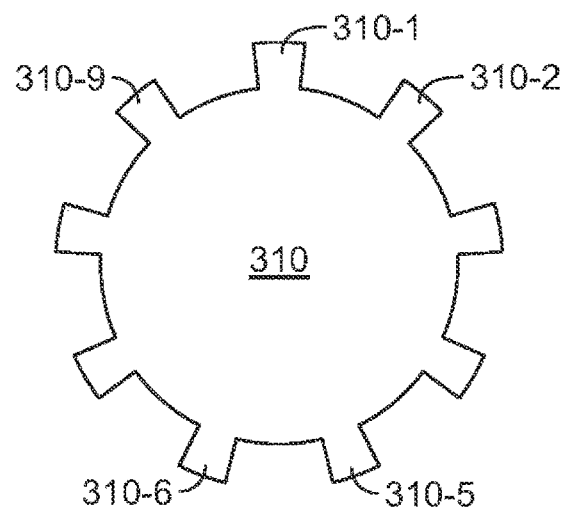
FIG. 10 is a schematic diagram of a first encoder element of a coupling element according to an embodiment.
Figure 11:
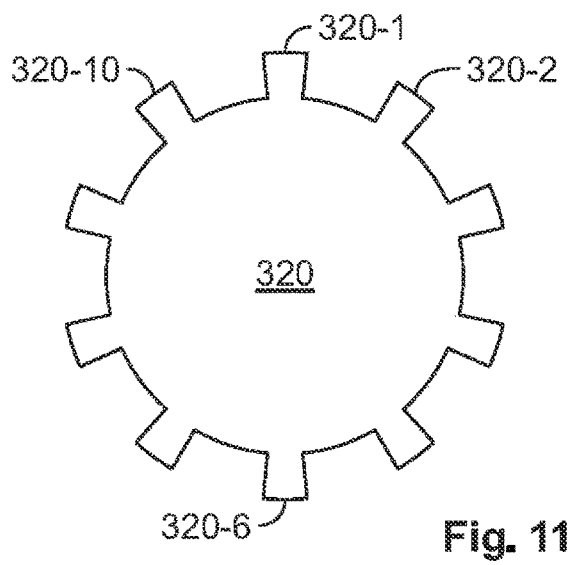
FIG. 11 is a schematic diagram of a second encoder element of the coupling element of FIG. 10.

The encoder elements 310 and 320, and the respective periodic geometries, are described with reference to FIGS. 10 and 11. Each of the first encoder 310 and second encoder 320 is formed by a periodically repeating teeth structure 310-1, 310-2, ..., 310-9 and 320-1, 320-2, ..., 320-10, respectively. For example, as shown in FIGS. 10 and 11, each of the encoder element 310 and 320 is formed by teeth with periodic geometry, thereby forming an encoder geometry with a certain period. The quantity of the periodic repetition of the first encoder geometry 310 is for example m=9 and corresponds to the quantity of the periodic repetition of the first receiver geometry 210. Similar, the quantity of the periodic repetition of the second encoder geometry 320 is for example n=10 and corresponds to the quantity of the periodic repetition of the second receiver geometry 220. In particular, the quantity of the periodic repetition of the encoder increases the signal amplitude compared to the configuration shown in FIG. 2. In other words, the lack of signal amplitude discussed with reference to FIG. 2 can be avoided by the use of n, resp. m teeth distributed around the encoder wheel with the same quantity of periodic repetition as employed by the corresponding receiver geometry 210, 220.

Using only one of the encoder wheels, e.g. only the first encoder geometry 310 the geometry causes the problem that, with such a design, a maximum signal amplitude at the coil with the same quantity of periodic repetition, i.e. in the first receiver coil, is generated. At the other hand, the other coil will create no signal. It is not possible to use an encoder wheel that creates a high amplitude in one of the first receiver geometry 210, but no signal in the receiver geometry 220 with the other period.

Figure 9:
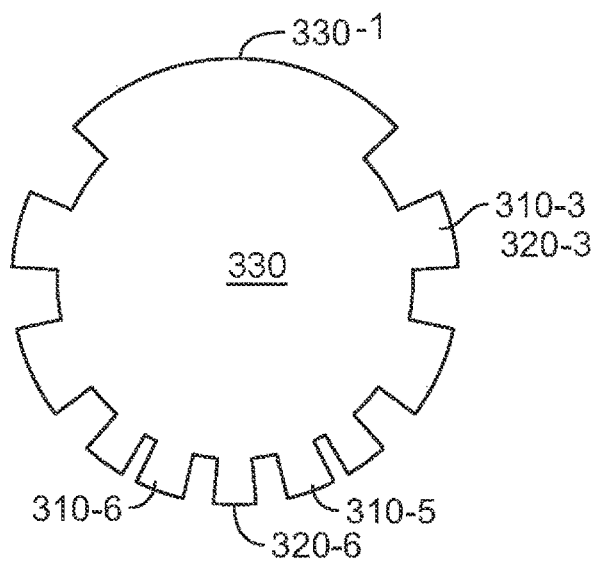
FIG. 9 is a schematic diagram of a coupling element according to an embodiment.

The combined wheel shown in FIG. 9, comprises an OR-combination of both encoder wheels shown in FIGS. 10 and 11. Such a combined encoder wheel reduces error components caused for example by an eccentricity. Consequently, such a combined wheel is advantageous in view of alignment requirements compared to the single tooth wheel shown in FIG. 2. In particular, alignment errors have less impact to the measuring accuracy.

In view of this OR-combination, the signal amplitudes of both signals is advantageously optimized. When the regular encoder wheels have the teeth width of 50% of a period, as discussed above with reference to FIG. 2, both teeth create the maximum amplitude. But when mixing such wheels in an OR-combination, as shown in FIG. 9, the encoder wheel will cover much more than 50% of the total teeth content. For example, the teeth 310-3 and 320-2 cover more than the optimal 50%, because both are partly overlapping. Therefore, less than 50% teeth width to period optimizes the maximum amplitude of both signals. For example, in the configuration show in FIG. 8, in order to maximize the signal amplitude, the optimum teeth width to period length relation is approximately 0.35.

Further, it is advantageous that both receiver coils create a comparable signal amplitude. Such a configuration enables that the measured signals are being successfully evaluated. Further, small gaps, which are difficult to produce, should be avoided. For example, in the configuration show in FIG. 8, in order to avoid small gaps and having a similar signal strength, the optimum teeth width to period length relation is approximately 0.32. Signals of the first encoder 310 and the second encoder 320 are superimposed thereby forming a sum signal in both receiver coils 210, 220.

Considering for this configuration the impact of alignment errors, it has been realized that even in view of an encoder element comprising both receiver geometries, alignment errors have a significant impact to the resolution. It has been identified that this is caused by an azimuthal dependency of the teeth density. This angular dependency influences the amplitude of the signals received by the evaluation circuit 20. Consequently, the amplitude of the determined signals has an angular dependency.

In a perfect aligned system, such amplitude variation has no influence to the result of the angle measurement. However, in case of alignment errors, caused for example during assembling the sensor or due to heat effects in the system, tilt errors or eccentricity errors occur. In such a case of a real system, a combination of a first and second encoder element will lead to different signal generation strength depending on the position on the wheel. In combination with alignment errors the amplitude variation deteriorates the accuracy of the measurement. For example, if a segment of the combined first and second encoder generates a signal with a high amplitude, an alignment error may severely deteriorate the angular measurement of the whole sensor, due to the fact that this one encoder segment dominates the sum signal.

For example, assuming a not shown overlap figure composed of FIGS. 10 and 11, the top position, i.e. at the position of the teeth 310-1 and 320-1, the teeth distribution is the same as on each of the simple, period-specific wheels shown in FIGS. 10 and 11. Therefore, in this area, nearly the full signal is created at both periods. At the bottom position, i.e. the position of teeth 310-5, 310-6 and 320-6, the combined wheel has teeth of the first period in the gaps between the second period teeth and vice versa. Therefore, in the bottom area, the created signals are compensating each other.

Figure 14:
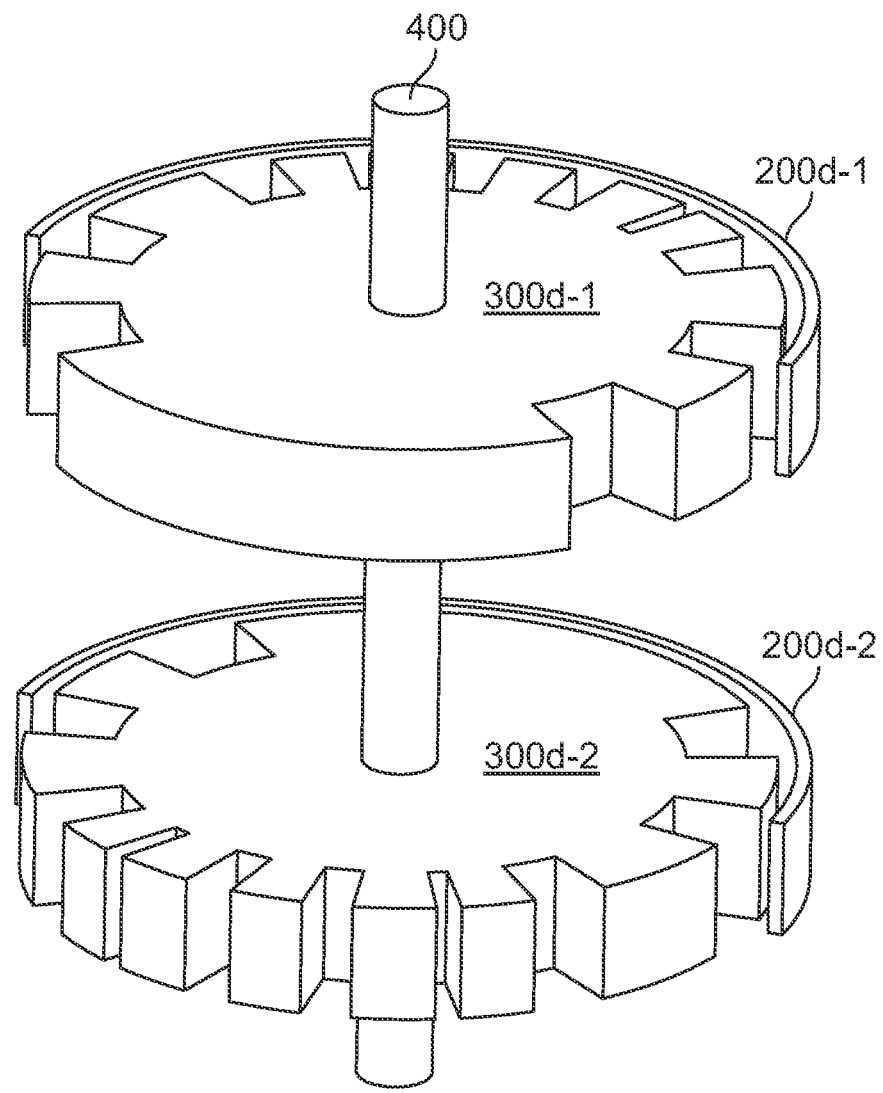
FIG. 14 is a schematic perspective view of a receiver section and a coupling element according to another embodiment with a shaft.

To compensate for this difference, the modified third encoder shown in FIG. 9 comprises a third encoder element 330. For example, when the three encoders shown in FIGS. 9-11 are assembled as shown in FIG. 14, the third encoder element 330 has a tooth 330-1 that connects the teeth 310-1 of encoder 310 (seen in FIG. 10) and 320-1 of encoder 320 (seen in FIG. 11) and the adjacent teeth 310-2 and 320-2, respectively, as well as 310-9 and 320-10 in the same manner. In other words, because of the tooth 330-1 of the third encoder element 330 both edges of the teeth 310-1/ 320-1 are removed and one edge of each of the adjacent teeth 310-2 and 320-2 (as well as 310-9 and 320-10) is removed in order to align the signal generation portion in the upper part with that in the lower part. By reducing the contribution of the signal of said first and second encoder combination, which for example has a high contribution to the signal amplitude, enables to reduce the influence of alignment errors. By such a configuration, one entire loop structure of the plurality of loop structures of the receiver coils can be neutralized. This allows a simple to fabricate encoder geometry, i.e., avoiding tiny structures in the encoder wheel, which may be difficult to fabricate.

As used herein, asymmetry is the violation of the symmetry provided by the periodicity of the first encoder element 310 and the second encoder element 320 when combing them to one encoder structure in connection with the periodically repeating loop structure. Such a configuration allows that amplitude variations, which are caused by the sum signal of the encoder, are minimized.

As shown in FIG. 9, the third encoder element 330 is designed as a conducting or ferromagnetic extension with an asymmetric geometry with respect to the periodic, i.e. symmetric, geometry of the receiver coils. The asymmetric geometry influences the strength of the inductive coupling between the exciter coil 100 and each of the receiver coils only in a part of the periodically repeating loop structures of the receiver coils that covers the full measurement range. In other words, the quantity of the periodic repetition of the third encoder element 330 is 1 and does not correspond to the quantity of the periodic repetition of the first or second receiver geometry. Such a configuration allows that a part of the periodically repeating loop structures of the receiver coils is not contributing to the analyzed signal. The conducting extension of the third encoder element 330 disturbs the signal only in a part of the plurality of periodically repeating loops of the receiver coils. In particular, the third encoder element 330 covers only a part of the strongest signal creating parts of the encoder in order to get a more regular distributed signal generation in the periodically repeating loop structures of the receiver coils. Consequently, the signal amplitude provided by the corresponding period of the loop structure is reduced. This third encoder element 330 minimizes the variations in the azimuthal dependent amplitude of the signal strength, and thus, reduces the influence of alignment errors.

As used herein, the conductive teeth and the conducting extensions are fabricated such that each teeth or extension influences a magnetic field in the receiver coils. For example, the conducing teeth or extensions being a blade of a conducting element.

In an embodiment, the three encoder elements 310, 320, 330 are mechanically linked to one another. Such a configuration allows a compact and easily manufactured encoder element. Further, such a configuration allows reduction of the alignment requirements for the individual encoder elements.

In more detail, and as best shown in FIG. 8, the conducting extension 330 can only be provided in a top region, i.e. has an asymmetric geometry. In other words, only a part of the periodically repeating loops are influenced by the conducting extension, due to the asymmetric geometry. Consequently, the net voltage induced in said one loop does not enable an angular position determination. In other words, the conducting element influences the signal amplitude in a part of the periodically repeating loop structure of the receiver coils without influencing the absolute position determination, which is possible by the other parts not influenced by the asymmetric geometry of the conductive extension. Therefore, even if the conducting extension deteriorates the signal amplitude, the tolerances for the alignment of the remaining parts can be increased. In other words, the accuracy of the modified combined encoder wheel, i.e. coupling element 300b, is high under all disturbing conditions, i.e. alignment conditions.

Additionally, it has been recognized that a further error in the determination of the rough position occurs. The rough position is obtained from the phase difference of the two signals of the receiver geometries and is needed for the absolute determination of the position. The fine position is then determined as an average value via the angle evaluation of the periodic signals. Such a coarse error can lead to a period jump with extremely high measuring error.

Further, this rough position error can be related to the tilt, e.g. between a sensor PCB and the rotary axis. Such a tilt leads to a fluctuating air gap between sensor PCB and the wheel. A fluctuating air gap in turn causes a very different sensitivity on different sides of the sensor.

FIG. 8 shows that the sensor signals are generated on both sides of the wheel, i.e. left and right side, while the bottom and top sides do contribute less to the signal. Therefore, in case of tilt errors, the teeth positions left and right do not fit well to the signal phase of the sum signal. A difference in sensitivity between left and right will therefore lead to considerable signal phase deviations in the sum signal. This is compensated by storing a look-up table mapping between an angle position and the phase difference.

In view of this further impact of an alignment error, a storage unit 50, as shown in FIG. 1, can be used. It has been recognized that the deviations, which easily can lead to large error jumps are—without changes in the mechanics—stable and their inverse function always leads to an unambiguous position. When the shape of the phase difference—angular position curve is stored in a look-up-table (LUT) a proper, reliable and accurate operation of the sensor is ensured. This phase difference corresponds to one angular position of the coupling element 300, which can be measured with a higher precision. In other words, the inductive sensor can apply the principle of a Vernier scale. Therefore, such a storage unit 50 allows saving calibration values that may be used to further increase alignment tolerances. A calibration run may be performed at the manufacturer or the user end.

As discussed with reference to FIGS. 2 to 11, the coupling elements 300a, 300b rotate around an axis of rotation. The coupling elements are disc shaped. The receiver coils are also arranged on discs. Both discs are opposing to each other. Such a configuration is particularly space saving.

Figure 12:
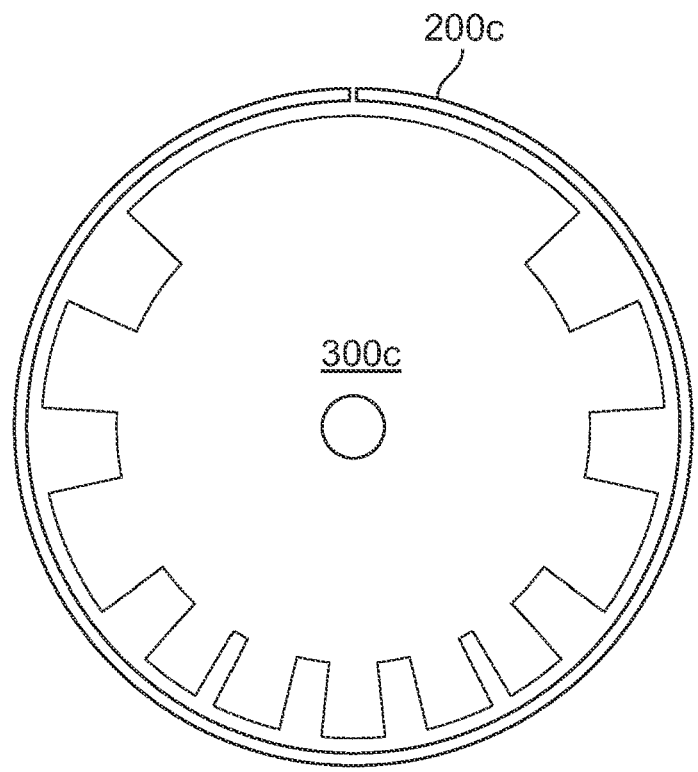
FIG. 12 is a schematic front view of a receiver section and a coupling element according to another embodiment.
Figure 13:
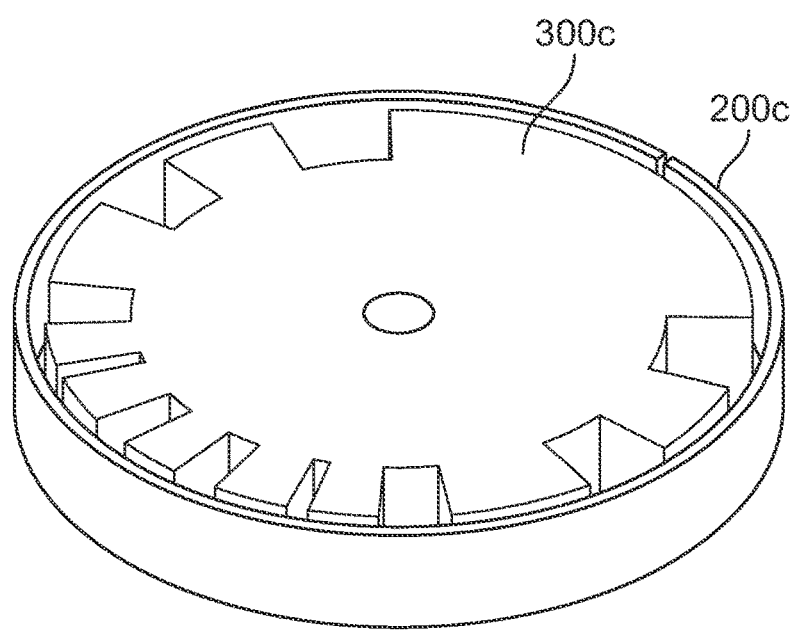
FIG. 13 is a schematic perspective view of the receiver section and the coupling element of FIG. 12.

FIGS. 12 and 13 show an alternative geometric arrangement of a receiver section 200c and a coupling element 300c. The receiver section 200c forms a lateral surface with regard to the axis of rotation. The coupling element 300c has a gear like shape. Such a configuration enables an easy connection of the receiver section 200c and coupling element 300c to a device. Such a solution allows that devices can be easily retrofitted.

In an embodiment, the receiver 200c is formed by a flexible circuit board, e.g. a printed circuit board. Such a configuration allows an easy fabrication of the receiver section and allows to arrange the receiver section in following the lateral surface by deforming the flexible circuit board.

FIG. 14 shows a further alternative geometric arrangement of a receiver section 200d and a coupling element 300d. The shaft 400 defines the axis of rotation. Similar to FIGS. 12 and 13, the receiver section 200d is formed as a lateral surface with regard to the axis of rotation. Similar to the solution of FIGS. 12 and 13, such a configuration enables an easy connection of the receiver section 200d and coupling element 300d to a device. Such a solution allows that devices can be easily retrofitted.

Different to the solution of FIGS. 12 and 13 is that the receiver comprises a plurality of receiver sections 200d-1 and 200d-2, e.g. a plurality of k=2 receivers. Such a configuration allows that each of the receiver sections 200d-1 and 200d-2 can cover only a part of the opposing coupling element 300d-1. 300d-2, e.g. in the case of k=2 receiver section are formed by a half cylinder. Therefore, such a configuration may be advantageous in particularly saving space.

Further, as shown in FIG. 14, the coupling element comprises a plurality of coupling elements 300d-1 and 300d-2, e.g. a plurality of k=2 coupling elements, wherein the number of coupling elements 300d is advantageously equal to the number of receiver sections 200d. Each coupling element 300d has a gear like shape. In an embodiment, each of the coupling elements 300d has an identical shape. Such a configuration allows that by rotating the coupling elements 300d against each other, a measurement with full resolution of a is possible. In contrast to a single, semicircle sensor (e.g. only receiver segment 200d-1 and coupling element 300d-1), which would result in very poor signals, this solution allows that the signal is improved, as the overall system relies on a signal integrated over the entire circumference of the wheel.

Even if the arrangement with reference to FIG. 14 is only shown for the lateral arrangement of the sensor with respect to the sensor, such a configuration can also be used with the embodiments shown with reference to FIGS. 8 to 10. For example, the sensor 200 can sandwich two planar multilayer sensors with U-shaped PCBs.

As used herein, lateral surfaces of an object is all of the sides of the object, excluding its base and top (when they exist). The lateral surface area is the area of the lateral surface. This is to be distinguished from the total surface area, which is the lateral surface area together with the areas of the base and top. For example, a right circular cylinder of radius r and height h, the lateral area is the area of the side surface of the cylinder: $A=2\pi rh$. This is also referred to as the cylinder or cylindrical surface.

In an embodiment, a method for determining an angular position is described. The method comprising the steps of: providing an inductive angle sensor 1 in line with any above described inductive angle sensor; receiving, by the receiver coils of first periodicity, a set of first signals, receiving, by the receiver coils of a second periodicity, a set of second signals, and calculating, by the evaluation circuit 20, the phase difference between the signals from first and second periodicity for determining the angle position.

In an embodiment, the method further comprises the steps of: generating, by a generation unit 40 shown in FIG. 1, a look-up-table, the look-up-table defining a relation between a calibration phase difference and an angular position; and storing, in the storage unit 50, at least the calibration phase difference.

The calibration, i.e. generating or measuring and saving or storing of the relation between phase difference and the angular position, can be done easy, even at the first switch-on of the sensor 1. In case of the first activation, the phase difference at the starting position is defined as 0°-value. From this moment on the exact actual position can be calculated from the two signals, in the following referred to as the n- and m-signal angle (fine position). When the position moves from one receiver coil period to the other, the actual period can be counted up or down. Therefore, it is possible to detect the position over the whole range with high fine position accuracy as an absolute value in the 360°-range. Therefore, one single movement over the whole measurement range enables the microcontroller to build up a look up table with the absolute phase differences depending on the position. When the sensor 1 is switched on the next time, i.e. after a calibration, the absolute position can be find using this look up table without the danger of a large error jump over one whole period.

In another embodiment, the method further comprises the step of comparing, with the evaluation circuit 20, the calculated phase difference with a stored calibration phase difference for determining the angle position. Such a configuration enables to identify a rough position error, determine a rough position, and compensate for such rough errors. In response to the comparing, the method may include, for example, calculating the correct value or outputting a warning that the calibration needs to be updated.

In another embodiment, the method further comprises the step of updating, by an updating unit 42 shown in FIG. 1, the calibration phase difference permanently or when the calculated phase difference deviates from the stored calibration phase difference more than a predetermined threshold value. It is possible to generate the look up table not only during an initial calibration run, but also in later measuring operations, either permanently or automatically when major differences between coarse and fine position calculations occur. Such a configuration enables compensation for changes in the mechanical assembly due to temperature, wear, drift or mechanical load during sensor life.

The inductive angle sensor 1 according to the present embodiments enables a particularly precise detection of angle position in a simple and cost-effective way. In particular, the inductive angle sensor 1 is tolerant to geometrical alignment errors. The inductive angle sensor 1 reduces the influence of alignment errors caused by tilting errors, i.e. tilt the sensor or the encoder with respect to a rotation axis, or eccentricity errors, i.e. an axis of rotation of the sensor does not align with an axis of rotation of the encoder.

The inductive angle sensor 1 also increases the signal amplitude generated by the receiver coils and avoids angular errors caused by an ambiguous phase relation. The inductive angle sensor 1 can also be manufactured simply and economically. Additionally, it is connectable to existing systems. The inductive angle sensor 1 reduces assembling efforts, in particular by reducing the number of parts to be assembled, and the manufacturing process to manufacture the structure of the sensing elements. The inductive angle sensor 1 provides a simple signal evaluation and a lightweight sensor.

What is claimed is:

1. An inductive angle sensor, comprising:
   an exciter coil;
   an oscillator circuit generating a periodic AC signal and coupling the periodic AC signal into the exciter coil;
   a plurality of receiver coils each forming a periodically repeating loop structure, an arrangement of each of the receiver coils forms a receiver geometry, a periodicity of the periodically repeating loop structure in each of the receiver coils is different;
   an evaluation circuit evaluating a plurality of signals induced in the receiver coils; and
   a coupling element comprising a first encoder element, a second encoder element and a third encoder element that is movable
   the first encoder element and the second encoder element comprising a plurality of conducting teeth with a periodic geometry, wherein a ratio of a width of one of the conducting teeth to a period length of the periodic geometry is less than 0.5, the first encoder element overlaying the second encoder element, and wherein a periodicity of the first encoder element is different from a periodicity of the second encoder element, the periodicity of the periodically repeating loop structure of each of the receiver coils correlates with the periodicity of one of the first encoder element and the second encoder element, wherein the periodicity of the loop structure of a first receiver coil along a circumferential direction correlates with the periodicity of the geometry of the first encoder element and the periodicity of the loop structure of a second receiver coil along the circumferential direction correlates with the periodicity of the geometry of the second encoder element, and the third encoder element is formed as a conducting extension with a rotationally asymmetric geometry, wherein the rotationally asymmetric geometry influences the strength of an inductive coupling between the exciter coil and the receiver coils only in a part of the periodically repeating loop structures of the receiver coils.

2. The inductive angle sensor of claim 1, wherein the first encoder element, the second encoder element, and the third encoder element are mechanically linked to one another.

3. The inductive angle sensor of claim 2, wherein the conducting extension connects a pair of adjacent conducting teeth of one of the first encoder element and the second encoder element.

4. The inductive angle sensor of claim 1, wherein the coupling element rotates around an axis of rotation.

5. The inductive angle sensor of claim 4, wherein the coupling element and a receiver section having the receiver coils are arranged on a plurality of opposing discs.

6. The inductive angle sensor of claim 4, wherein the coupling element and a receiver section having the receiver coils are arranged on a plurality of opposing lateral surfaces.

7. The inductive angle sensor of claim 1, wherein a quantity of periodic repetitions in the periodically repeating loop structures of the receiver coils are coprime to one another over a complete measuring range of the inductive angle sensor.

8. The inductive angle sensor of claim 1, wherein the exciter coil and/or at least one of the receiver coils lies in a plane.

9. The inductive angle sensor of claim 8, wherein at least one of the receiver coils is a conductive path on a PCB.

10. The inductive angle sensor of claim 1, further comprising a microcontroller including the oscillator circuit and the evaluation circuit.

11. The inductive angle sensor of claim 10, wherein the oscillator circuit powers the exciter coil and the evaluation circuit has a plurality of inputs each directly or indirectly connected with one of the receiver coils.

12. The inductive angle sensor of claim 1, further comprising a storage unit storing a calibration table containing an absolute angular position depending on a signal phase difference.

13. The inductive angle sensor of claim 1, wherein the receiver coils lie in a plane and are overlapping in a receiver section.

14. The inductive angle sensor of claim 1, wherein the receiver coils lie in a plane and are overlapping in a plurality of receiver sections.

15. A method for determining an angular position, comprising:

providing an inductive angle sensor according to claim 1;

receiving, by a first receiver geometry with a first periodicity, a first signal set, which is used to calculate a first position;

receiving, by a second receiver geometry with a second periodicity, a second signal set, which is used to calculate a second position; and calculating, with the evaluation circuit, a phase difference between the first position and the second position to determine an angular position.

16. The method of claim 15, further comprising generating a look-up-table, the look-up-table defining a relation between a calibration phase difference and the angular position.

17. The method of claim 16, further comprising storing the calibration phase difference.

18. The method of claim 16, further comprising comparing, with the evaluation unit, the phase difference with the calibration phase difference stored in the look-up table for determining the angular position.

19. The method of claim 18, further comprising updating the phase difference permanently or when the phase difference deviates from the calibration phase difference stored in the look-up table by more than a predetermined threshold value.

* * * * *